United States Patent [19]

McNeil

[11] Patent Number: 5,045,611
[45] Date of Patent: Sep. 3, 1991

[54] PROCESSES FOR THE PREPARATION OF POLYMERS

[75] Inventor: Daniel M. McNeil, Georgetown, Canada

[73] Assignee: Xerox Corporation, Stamford, Conn.

[21] Appl. No.: 544,291

[22] Filed: Jun. 25, 1990

[51] Int. Cl.$^5$ .............................................. C08F 2/18
[52] U.S. Cl. ....................................... 526/81; 526/84; 526/233; 526/225; 526/340; 526/340.1; 524/706; 524/836
[58] Field of Search ................... 526/81, 84, 233, 225; 524/706, 836

[56] References Cited

U.S. PATENT DOCUMENTS

| | | | |
|---|---|---|---|
| 2,579,908 | 4/1946 | Davidson et al. | 260/83.7 |
| 3,882,195 | 5/1975 | Daniels et al. | 260/878 R |
| 4,129,706 | 12/1978 | Keppler | 526/233 |
| 4,241,191 | 12/1980 | Keppler | 526/233 |
| 4,528,321 | 7/1985 | Allen et al. | 524/761 |
| 4,558,108 | 12/1985 | Alexandru et al. | 526/340 |
| 4,659,641 | 4/1987 | Mahalek et al. | 430/137 |
| 4,816,366 | 3/1989 | Hyosu et al. | 430/137 |

FOREIGN PATENT DOCUMENTS 53-129275 11/1978 Japan .
58-109510 6/1983 Japan .
62-89703 4/1987 Japan .
62-169801 7/1987 Japan .

OTHER PUBLICATIONS

Chem. Abstracts 108:76096e.
Chem. Abstracts 99:159394x.
Chem. Abstracts 90:104882p.
Chem. Abstracts 107:176720b.
Chem. Abstracts 107:176721c.

*Primary Examiner*—Joseph L. Schofer
*Assistant Examiner*—M. Nagumo
*Attorney, Agent, or Firm*—E. O. Palazzo

[57] ABSTRACT

A process for the preparation of polymers which comprises forming an aqueous phase comprised of water and a surfactant; adding to the aqueous phase monomers; subsequently initiating polymerization of the monomers; thereafter adding a stabilizing component; and completing the polymerization.

26 Claims, No Drawings

PROCESSES FOR THE PREPARATION OF POLYMERS

BACKGROUND OF THE INVENTION

This invention is generally directed to processes for the preparation of polymers, especially toner resin polymer compositions. In one embodiment, the present invention is directed to processes for the preparation of polymers by suspension polymerization wherein there is initially formed an aqueous phase containing a surfactant, thereafter adding monomers thereto and initiating polymerization, subsequently adding a stabilizer such as tricalcium phosphate, and completing the polymerization. Another embodiment of the present invention relates to the preparation of polymers, such as styrene butadiene toner polymers comprising forming by, for example, mixing an aqueous phase containing a surfactant or emulsifier, such as ALKANOL TM, like an alkali alkyl naphthalene sulfonate; thereafter adding monomers thereto, initiating polymerization thereof; subsequently adding a stabilizer such as tricalcium phosphate, and completing the polymerization. One advantage associated with the process of the present invention resides in a reduction in the amount of undesirable ash containing, for example, tricalcium phosphate, for example in some embodiments up to 50 percent less ash is obtained as compared to, for example, some present suspension polymerization processes. With standard known suspension polymerizations for the preparation of toner polymers such as styrene butadiene copolymers, reference U.S. Pat. No. 4,558,108, the disclosure of which is totally incorporated herein by reference, tricalcium phosphate stabilizers can be added to the aqueous phase prior to the polymerization of the reaction mixture resulting in polymers that may have undesirable amounts of ash. It is believed that the residual ash remaining from the suspension stabilizer tricalcium phosphate with the aforementioned suspension polymerization may, for example, chemically interact with the charge enhancing additives selected for the toner resulting in an undesirable rapid admix behavior degradation with aging, a disadvantage avoided or minimized with the process of the present invention.

The polymers obtained with the process of the present invention can be formulated into toners by, for example, the addition thereof to pigments or dyes, optional additives such as charge control materials, low molecular weight waxes such as polypropylene, polyethylene, and the like. Also, the toner composition obtained can be optionally blended with surface additives, which may function as flow aids, such as colloidal silicas and the like.

. The preparation of toner polymers by suspension polymerization, emulsion polymerization, and other similar methods are known, reference the suspension method disclosed in the aforementioned '108 patent. In these processes, especially the suspension polymerization, there is selected a stabilizer component, such as tricalcium phosphate, which stabilizes the suspension and prevents substantial bead sticking. Toners can then be generated by mixing the formed polymer with pigments in a melt mixing apparatus or an extrusion device. With the processes of the present invention, in embodiments thereof suspension polymerization is accomplished by preparing an aqueous phase comprised of water and a surfactant such as ALKANOL TM; heating this phase to an effective temperature of, for example, 95° C.; adding the desired monomers such as styrene and butadiene together with polymerization initiators such as benzoyl peroxide and TBEC (O,O-t-butyl-O(2-ethylhexyl)monoperoxy-carbonate), whereby there is formed a suspension of monomer droplets in the aqueous solution; initiating polymerization; adding a suspension stabilizer, such as tricalcium phosphate; and thereafter completing polymerization by heating. Since particle formation and polymerization are initiated prior to the addition of the stabilizer, it is believed that a substantial decrease in trapped stabilizer inside the polymer particles occurs resulting in, for example, an ash content of from about 0.005 percent to 0.03 percent in embodiments of the present invention. In contrast, with the aforementioned prior art suspension polymerization process there is first formed an aqueous phase of water, tricalcium phosphate, and ALKANOL TM; thereafter heating the formed mixture; adding monomers, such as styrene and butadiene together with an initiators such as benzoyl peroxide and TBEC (O,O-t-butyl-O(2-ethylhexyl)monoperoxy-carbonate); forming a suspension that entraps some of the stabilizer; heating, for example, to 95° C. forming a styrene butadiene copolymer with an undesirable high ash content (TCP), that is for example the ash content is from about 0.04 percent to about 0.15 percent.

Dispersion polymerization, suspension polymerization, emulsion polymerization, and the like are known. Disclosed in U.S. Pat. No. 4,486,559 is the preparation of a toner composition by the incorporation of a prepolymer into a monomer/pigment mixture, followed by emulsion polymerization. Also, methods of preparing toner, including suspension/dispersion polymerization, are illustrated in this patent. In these processes, the pigment and additives such as charge control components are added to a monomer or comonomers prior to polymerization. Particle formation is achieved by the dispersion of the pigmented monomer or comonomers in a continuous phase such as water, and the droplets of pigmented monomers are then polymerized to form toner particles. One advantage of these processes as compared to some other known methods is the elimination of fusion mixing (Banbury/extruder) and pulverization classification processing. With these processes, undesirable ash content can result causing toners with the polymers prepared to exhibit undesirable admix characteristics as indicated herein.

In a patentability search report the following United States patents were listed: U.S. Pat. No. 4,528,321 which discloses a polymer dispersing system comprising a polymerization stabilizer and a nonionic compound, which compound may include alkanols, polyalkylene glycol monoethers, alkonates, and benzyl alcohol, reference for example column 3; U.S. Pat. No. 4,659,641 discloses an improved process for the preparation of resin particles by bead polymerization, see the Abstract of the Disclosure for example; and U.S. Pat. No. 4,816,366 which discloses processes for the preparation of toners by certain suspension polymerization methods, see for example the Abstract of the Disclosure, and column 3. The disclosures of each of the aforementioned patents are totally incorporated herein by reference.

In U.S. Pat. No. 4,507,378 there is illustrated a process for the preparation of toner compositions for electrophotography which involves polymerizing an aqueous suspension of a monomer such as styrene in the presence of a dispersant which includes a phosphate compound. According to the disclosure of this patent, once polymerization occurs the dispersant is removed by adding a dilute acid and a final product is obtained subsequent to rinsing with water.

Furthermore, in U.S. Pat. No. 4,659,641, the disclosure of which is totally incorporated herein by reference, there is illustrated a polymerization process for toner resin compositions, reference Example I, wherein a styrene n-butyl methacrylate copolymer with 2 percent wax is dispersed in water. A suspending agent, tricalcium phosphate, and a surfactant in a monomer solution can be added to the initial mixture with a polymerization initiator such as benzoylperoxide. After polymerization occurs, nitric acid is added to remove the tricalcium phosphate and the final product is filtered, washed, and dried.

In U.S. Pat. No. 4,894,309, the disclosure of which is totally incorporated herein by reference, there is illustrated a polymerization process for the preparation of crosslinked copolymers for toner resin compositions, reference Example I, wherein a styrene butadiene copolymer crosslinked with divinylbenzene is formed in an aqueous phase of tricalcium phosphate and ALKANOL TM. After polymerization occurs, nitric acid is added to remove the tricalcium phosphate and the final product is filtered, washed, and dried.

Although the above-mentioned processes for preparing polymer particles useful in toner compositions are suitable for their intended purposes in most instances, there remains a need for other processes wherein there can be obtained products of high purity, that is for example with ash contents of less than 0.1 percent for example.

SUMMARY OF THE INVENTION

It is, therefore, a feature of the present invention to provide processes for the preparation of polymers, especially toner polymers with many of the advantages illustrated herein.

Another feature of the present invention resides in the preparation of toner polymers with low ash content, that is for example an ash content of from about 0.005 percent to about 0.03 percent compared to 0.04 percent to about 0.15 percent for the prior art suspension polymerization processes.

Furthermore, in another feature of the present invention there are provided processes for the preparation of toner polymers by suspension polymerization wherein stabilizing components, such tricalcium phosphate, are added to the reaction mixture containing monomer and/or polymer in an aqueous phase.

In another feature of the present invention there are provided processes that enable toners with improved admix characteristics since, for example, less ash, it is believed, is present in the polymer product.

Furthermore, in another feature of the present invention there are provided processes wherein an alkanol functions as a stabilizer during the first stages of the suspension reactions, and wherein the addition of stabilizers, such as tricalcium phosphate, is not required in the aqueous phase until, for example, subsequent to the addition of monomers, thus the monomers can be added or injected into an aqueous phase of water and alkanol, and the monomer droplets formed during and shortly after injection should not contain any stabilizer such as tricalcium phosphate. Thereafter, the stabilizer, such as tricalcium phosphate, can be added to the reaction mixture.

Another feature of the present invention resides in the preparation of toner polymers wherein the ash content is reduced by up to about 75 percent.

These and other features of the present invention can be accomplished in embodiments thereof by the provision of processes for the preparation of polymers. More specifically, the present invention is directed to the preparation of toner polymers wherein the stabilizing components, such as tricalcium phosphate, are added subsequent to the initiation of the polymerization of monomers in an aqueous phase. In one embodiment, the present invention is directed to a process for the preparation of toner polymers which comprises forming a water phase comprised of a surfactant, monomers, and an initator such as benzoyl peroxide; admixing the aforementioned phases; initiating polymerization of the resulting mixture; adding a stabilizing component such as tricalcium phosphate thereto; and completing polymerization thereof by, for example, heating. Subsequent to polymerization and cooling of the reaction mixture, the polymer product resulting, such as a styrene butadiene polymer, can be subjected to an optional washing with, for example, an acid, such as nitric acid, for the primary purpose of removing any remaining stabilizing component. In the prior art suspension processes mentioned herein, the stabilizing component is added to the aqueous phase prior to the addition of the monomers, thus the ash level is higher, for example from about 0.04 percent to about 0.15 percent, than that obtained with the process of the present invention. High ash levels are suspected of causing undesirable toner admix charging times as indicated herein. For example, after 5,000 imaging cycles in a xerographic imaging test fixture the admix time of uncharged toner with the polymers containing high ash content can be increased from about 30 seconds to about 2 minutes, it is believed. These and other disadvantages are avoided with the processes of the present invention, wherein, for example, the admix times of toner are from about 15 to about 60 seconds in embodiments thereof.

In an embodiment, the process of the present invention comprises (1) dissolving a surfactant in water, agitating, and heating the resulting solution to a temperature of from about 50° C. to about 110° C.; (2) adding to the aqueous phase monomer or comonomers premixed with initiators, thus forming a suspension of monomer droplets that contain no stabilizer; (3) initiating polymerization at a temperature of from about 50° C. to about 110° C. and continuing polymerization for between about 1 minute to 2 hours; (4) mixing a slurry of stabilizer with water in a concentration of from about 5 percent to 50 percent by weight of stabilizer; (5) adding the slurry of stabilizer to the reactant mixture before completion of polymerization, thus forming, for example, a protective coating on the surface of the polymerizing suspension particles that prevents agglomeration of the particles towards the end of the polymerization reaction; (6) continuing the reaction at a temperature of from about 50° C. to about 110° C. for between about 1 hour to about 15 hours; (7) then heating to a temperature of from about 110° C. to about 150° C. and retaining the reaction mixture at this temperature for between 30 minutes and 3 hours; (8) cooling the mixture to between about 20° C. and 75° C.; (9) adding to the mixture of polymers an amount of acid equivalent to between 1 percent and 10 percent of the weight of water in the mixture to dissolve any stabilizer; (10) separating the particles by, for example, filtration or centrifugation; (11) washing, for example, the acid off the formed polymer particles with water; and (12) drying the polymer particles obtained.

The process of the present invention in embodiments thereof reduces ash content by, it is believed, forming a suspension at the start of polymerization without the presence of any stabilizer. As the polymerization proceeds, the viscosity of the individual suspended particles increases. The stabilizer can then be added into the suspension at a point before the particles become sticky enough to agglomerate.

Illustrative examples of monomer or comonomers selected for the processes of the present invention and present in effective amounts of, for example, from about 1 percent to 99 percent by weight of monomer as illustrated herein include vinyl monomers such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids with a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated monoolefins such as isobutylene and the like; vinylidene halides such as vinylidene chloride and the like; N-vinyl compounds such as N-vinyl pyrrole and the like; butadiene and isoprene monomers; and mixtures thereof. In one embodiment, there is selected a monomer of styrene and a monomer of butadiene to enable, for example, a styrene butadiene copolymer with from about 75 to about 95 percent by weight of styrene.

Examples of initiator present in effective amounts of, for example, from about 0.5 percent to 10 percent by weight of monomers, include azo and diazo compounds such as azoisobutyrlnitrile, azodimethylvaleronitrile, azobiscyclohexanitrile, 2-methylbutyrylnitrile, diazoamine-azobenzene, mixtures thereof, and the like; peroxide initiators such as lauroyl peroxide, benzoyl peroxide, acetyl peroxide, decanoyl peroxide mixtures thereof, and the like; carbonate initiators such as O,O-t-butyl-O(2-ethylhexyl) monoperoxycarbonate, O,O-t-amyl-O(2-ethylhexyl) monoperoxycarbonate, peroxydicarbonates, other known initiators, and the like. The bulk polymerization temperature is usually selected according to the initiators types. Generally, the molecular weight of polymer decreases as the amount of initiator or polymerization temperature increases. The bulk polymerization temperature, initiator types and concentration can be selected to obtain partially polymerized monomer with 10 to 40 percent polymer with a weight average molecular weight in the range of 10,000 to about 200,000. This polymer will assist in the dispersion of pigment and also can coat the pigment particle and, therefore, minimize the inhibition effects of pigment on the suspension polymerization.

Stabilizer present in effective amounts as illustrated herein, such as for example from about 0.5 percent to about 20 percent of the monomer weight and in the U.S. Pat. No. 4,558,108, for example, and selected for the process of the present invention include nonionic and ionic water soluble polymeric stabilizers such as methyl cellulose, ethyl cellulose, hydroxypropyl cellulose, block copolymers such as Pluronic E87 available from BASF, the sodium salts of carboxyl methyl cellulose, polyacrylate acids and their salts, polyvinyl alcohol, gelatins, starches, gums, alginates, zein, casein and the like; and barrier stabilizers such as tricalcium phosphate, talc, barium sulfate and the like.

The aqueous phase usually contains a concentration of ionic surfactant from about 50 parts per million to about 1,000 parts per million. The ratio of the aqueous phase weight to the monomer weight is between about 0.7:1 and about 2:1. Typical ionic surfactants include sodium alkyl naphthalene sulfonate, sodium oleate, dodecyl benzene sodium sulfonate, sodium tetradecyl sulfate, and the like.

Example of acid present in effective amounts as illustrated herein, such as for example from about 1 percent to 20 percent of the aqueous phase weight, are nitric acid, sulfuric acid, hydrochloric acid, citric acid, and the like.

Removal of the acid from the polymers can be accomplished by water washing during the filtration of the polymers in amounts of from about 1 to 20 times the weight of polymers present depending on the acid type and concentration. Particle size ranges of polymer products are from about 100 microns to about 1,000 microns in average diameter.

Ash content can be measured by heating a 20 gram sample of polymer product in a platinum crucible in a programmable muffle furnace. The furnace is programmed to heat the sample from 30° C. to 300° C. over 270 minutes and then heat from 300° C. to 500° C. over 100 minutes, maintain 500° C. for 30 minutes, heat from 500° C. to 800° C. over 60 minutes, hold at 800° C. for 120 minutes then cool gradually over several hours to room temperature. The remaining ash left in the crucible is weighed and calculated as a percentage of the weight of the original 20 gram polymer sample. Residual styrene monomer in the final polymer product can be as low as about 0.05 percent by weight. Residual butadiene monomer in the final polymer product can be as low as about 17 parts per million by weight. Drying of the polymers can be accomplished in a batch or continuous fluidized bed dryer at a temperature range of from about 30° C. to about 60° C. over a time period from about 5 minutes to about 45 minutes.

Polymers obtained with the processes of the present invention include styrene butadiene copolymers.

Toner compositions can be formed by admixing the formed polymers obtained with the processes of the present invention with pigment particles; optional charge additives, such as alkyl pyridinium halides, distearyl dimethyl ammonium methyl sulfate, and the like; surface additives such as metal salts of fatty acids, and the like. The toners formed may be micronized and classified as is known in the art to enable toner particles with an average particle diameter of from about 9 to about 25 microns. Banbury melt mixing devices and extrusion devices can be selected for the preparation of the toners. Developers can be generated by mixing the toners with carrier particles with or without a coating, reference U.S. Pat. Nos. 4,937,166 and 4,935,326, the disclosures of which are totally incorporated herein by reference.

The following examples are being submitted to further define various species of the present invention. These examples are intended to be illustrative only and are not intended to limit the scope of the present invention. Also, parts and percentages are by weight unless otherwise indicated.

EXAMPLE I

To 5.5 kilograms of styrene were added 224.6 grams of benzoyl peroxide and 28.74 grams of TBEC (O,O-t-butyl-O(2-ethylhexyl)monoperoxy-carbonate), which components were mixed until dissolved. This mixture was then transferred to a 15 liter stainless steel pressure reactor vessel and 804 grams of butadiene were added to the vessel under pressure. A solution of 7.2 kilograms of water and 3.62 grams of sodium alkyl naphthalene sulfonate ALKANOL TM XC, obtained from E.I. du-Pont de Nemours) was charged into a 5 gallon stainless steel reactor and agitated at 210 rpm. A mixture of 132.6 grams of TCP (tricalcium phosphate), 0.5 gram of AL-KANOL TM and 1.0 kilogram of water was prepared and charged into a 3 liter stainless steel bomb. The aqueous solution in the reactor was heated up to 95° C. Temperature control was achieved using a cascade control loop that controlled the temperature of the water flowing through the reactor jacket. The vessel containing the styrene, butadiene and initiators was connected to the reactor via a ⅛" stainless steel tube. When the reactor temperature reached 95° C., the previously prepared monomer and initiator mixture was transferred into the reactor vessel over a 13 minute period. The reactor was allowed to pressurize during the monomer mixture addition. After the addition was completed, the reactor was pressurized to 420 kilopascals with nitrogen. One minute later the bomb containing the TCP slurry was connected to a reactor port and the contents injected therein under pressure. The reactor pressure was increased to 520 kilopascals. The reactor temperature was held at 95° C. for 195 minutes then ramped up to 125° C. over 40 minutes, held there for 60 minutes, and then cooled to 455° C. over 90 minutes. One kilogram of 35 percent nitric acid was added to the reactor contents to dissolve the TCP. The reactor contents were agitated 30 minutes before being discharged into a filter. The resulting polymer product of styrene butadiene (89/11) was washed with deionized water until all the acid was removed. The resulting polymer styrene butadiene (89/11) when analyzed had an ash content of 0.0078 percent, and a Tg of 59.25° C.

EXAMPLE II

The process of Example I was repeated with the exception that the TCP slurry was not added to the reactor until 60 minutes after the completion of the monomer injection. The resulting polymer had an ash content of 0.0048 percent and a Tg of 59.05° C.

EXAMPLE III

In a 30 gallon stainless steel vessel 110 kilograms of styrene, 4.15 kilograms of benzoyl peroxide and 5747.7 grams of TBEC (O,O-t-butyl-O(2-ethylhexyl)-monoperoxy-carbonate) were mixed until dissolved. Through a sparge tube in the reactor 804 grams of butadiene were then added under pressure. A solution of 134 kilograms of water and 48.7 grams of ALKANOL TM was charged into a 100 gallon stainless steel reactor and agitated at 200 rpm. A mixture of 1.14 kilograms of TCP (tricalcium phosphate), 7.3 grams of AL-KANOL TM and 20.0 kilograms of water was prepared and charged into a 25 liter stainless steel pressure vessel connected to the 100 gallon reactor. The aqueous solution in the 100 gallon reactor was heated up to 95° C. Temperature control was achieved using a cascade control loop that controlled the temperature of the water flowing through the reactor jacket. A 30 gallon vessel containing the said monomers and initiators was connected to the reactor via a ⅜ inch stainless steel tube. When the reactor temperature reached 95° C., the monomers and initiators were transferred into the reactor over a 14 minute period. The reactor was allowed to pressurize during the monomer addition. After the addition was completed, the reactor was pressurized to 520 kilopascals with nitrogen. The temperature was maintained at 95° C. One hour after the monomer addition was completed the TCP slurry was injected into the reactor under pressure. The reactor pressure was increased back up to 520 kilopascals (pressure drops during polymerization due to the consumption of butadiene). The reaction was continued at 95° C. for another 135 minutes then ramped up to 125° C. over 40 minutes, held there for 60 minutes, and then cooled to 45° C. over 90 minutes. Nine kilograms of 35 percent nitric acid were added to the reactor contents to dissolve the TCP (tricalcium phosghate). The reactor contents were agitated 30 minutes before being discharged into a centrifuge. The polymer product was washed with deionized water until all the acid was removed. The resulting polymer of styrene butadiene (91/9) when analyzed had an ash content of 0.014 percent, a Tg of 56.9° C., a melt index (MI) of 21.6, a molecular weight ($M_w$) of 143,500, a number average molecular weight ($M_n$) of 20,400, and a molecular weight distribution ($M_w/M_n$) of 7.02.

EXAMPLE IV

The process of Example III was repeated with the exceptions that 54.8 grams of ALKANOL TM were dissolved in 134 kilograms of water and 8.2 grams of ALKANOL TM was added to the TCP slurry. The resulting polymer when analyzed had an ash content of 0.021 percent, a Tg of 57.5° C., a melt index (MI) of 24.0, a molecular weight ($M_w$) of 137,600, a number average molecular weight ($M_n$) of 20,300 and a molecular weight distribution ($M_w/M_n$) of 6.79.

EXAMPLE V

In this Example the standard procedure of adding the stabilizer prior to monomer addition, reference U.S. Pat. No. 4,558,108, was accomplished in a 100 gallon reactor. The procedure used was identical to Example III except that the TCP was dispersed in 154 kilograms of water with 56 grams of ALKANOL TM. The aqueous mixture was heated as in Example III prior to the addition of the monomers. The resulting polymer when analyzed had an ash content of 0.04 percent, a molecular weight ($M_w$) of 142,700, a number average molecular weight ($M_n$) of 21,700 and a molecular weight distribution ($M_w/M_n$) of 6.58.

Other embodiments and modifications of the present invention may occur to those skilled in the art subsequent to a review of the present application. These embodiments and modifications, as well as equivalents thereof, are also included within the scope of the present invention.

What is claimed is:

1. A process for the preparation of polymers which comprises forming an aqueous phase comprised of water and a surfactant; adding to the aqueous phase monomers; subsequently initiating polymerization of the monomers, subject to the provision that no suspension stabilizing component is present during initiation of polymerization; thereafter adding a suspension stabilizing component; and completing the polymerization.

2. A process for the preparation of polymers which comprises forming an aqueous phase comprised of water and a surfactant; adding to the aqueous phase at least two monomers; subsequently initiating polymerization of the monomers, subject to the provision that no suspension stabilizing component is present during initiation of polymerization; thereafter adding a suspension stabilizing component; and completing polymerization.

3. A process for the preparation of polymers which comprises forming an aqueous phase comprised of water and a surfactant; adding to the aqueous phase at least two monomers; subsequently initiating polymerization of the monomers by heating, subject to the provision that no suspension stabilizing component is present during initiation of polymerization; thereafter adding a suspension stabilizing component; completing polymerization; cooling and washing the polymer product obtained.

4. A process in accordance with claim 1 wherein the addition of the suspension stabilizing component is accomplished after the initiation of the polymerization.

5. A process in accordance with claim 1 wherein the suspension stabilizing component is tricalcium phosphate.

6. A process in accordance with claim 1 wherein the surfactant component is sodium alkyl naphthalene sulfonate.

7. A process in accordance with claim 1 wherein the monomers are comprised of styrene and butadiene.

8. A process in accordance with claim 1 wherein the polymerization is completed by heating at a temperature of from about 40° to about 125° C.

9. A process in accordance with claim 1 wherein the monomer solution contains a polymerization initiator.

10. A process in accordance with claim 2 wherein from 2 to about 10 monomers are selected.

11. A process in accordance with claim 2 wherein a styrene butadiene toner resin polymer is obtained.

12. A process in accordance with claim 3 wherein washing is accomplished with an acid.

13. A process in accordance with claim 2 wherein the ash content of the polymer product is from about 0.005 percent to about 0.03 percent.

14. A process for the preparation of a polymer which comprises forming an aqueous phase comprised of water and a surfactant; adding to the aqueous phase monomers and initiators; subsequently initiating polymerization of the monomers, subject to the provision that no suspension stabilizing component is present during initiation of polymerization; thereafter adding a suspension stabilizing component prior to the completion of polymerization; and completing polymerization by heating; whereby there results a polymer with a substantial amount reduction in the stabilizing component trapped inside the resin polymer product.

15. A process in accordance with claim 14 wherein the stabilizing component trapped inside the polymer beads (ash content) is reduced by at least 50 percent compared to a process in which the suspension stabilizing component is added to the aqueous phase prior to the addition of the monomer(s).

16. A process in accordance with claim 14 wherein the suspension stabilizing component is tricalcium phosphate.

17. A process for preparing low ash styrene butadiene polymers which comprises mixing styrene monomer, butadiene monomer, first and second initiators in an aqueous phase comprised of water and a surfactant, heating the resulting mixture for about 1 minute to about 2 hours at a temperature of from about 50° C. to about 110° C. to accomplish partial polymerization, subject to the provision that no suspension stabilizing component is present during initiation of polymerization, thereafter mixing in a finely-divided water insoluble, monomer insoluble suspension stabilizer in an amount of between about 0.5 percent and about 20 percent of the weight of said monomers, thereafter continuing the polymerization from between about 1 hour to about 15 hours, thereafter heating the mixture at a temperature of from about 110° C. to about 150° C., cooling the mixture and adding an acid, thereafter isolating the resulting styrene butadiene copolymer with a weight average molecular weight of between about 10,000 and 500,000, a molecular weight distribution of between about 2 and about 9, a Tg of between about 45° C. and about 75° C., the ratio of said styrene monomer and said butadiene monomer being between about 80:20 and about 95:5 by weight, the weight proportion of said aqueous phase to the combination of said styrene monomer and said butadiene monomer being between about 0.8:1 and 2:1.

18. A process for the preparation of a polymer which comprises forming an aqueous phase comprised of water and a surfactant; adding to the aqueous phase monomers; subsequently initiating polymerization of the monomers, subject to the provision that no suspension stabilizing component is present during initiation of polymerization; and thereafter adding a suspension stabilizing component; and completing the polymerization by heating.

19. A process in accordance with claim 2 comprising mixing styrene monomer, butadiene monomer, benzoyl peroxide and TBEC (O,O-t-butyl-O(2-ethylhexyl)-monoperoxy-carbonate) in an aqueous phase comprised of water and sodium alkyl naphthalene sulfonate, maintaining constant agitation of the mixture, heating the resulting mixture from about 1 minute to about 2 hours at a temperature of from about 50° C. to about 110° C. to accomplish partial polymerization, subject to the provision that no suspension stabilizing component is present during initiation of polymerization, thereafter mixing in a tricalcium phosphate suspension stabilizer in an amount between about 0.5 percent and about 20 percent of the weight of said monomers, thereafter continuing the polymerization at a temperature of from about 50° C. to about 110° C. from between about 1 hour to about 15 hours, thereafter heating the mixture at a temperature of from about 110° C. to about 150° C., cooling the mixture and adding nitric acid to remove the stabilizer, thereafter isolating the resulting styrene butadiene copolymer with a weight average molecular weight of between about 10,000 and 500,000, a molecular weight distribution of between about 2 and about 9 and a Tg of between about 45° C. and about 75° C. the ratio of said styrene monomer and said butadiene monomer being between about 80:20 and about 95:5 by weight, the weight of said benzoyl peroxide being between about 0.5 percent to about 10 percent by weight of the combination of said styrene and butadiene, the weight of said TBEC (O,O-t-butyl-O(2-ethylhexyl)-monoperoxy-carbonate) being between about 0.5 percent to about 5 percent by weight of the combination of said styrene and butadiene, the weight proportion of said aqueous phase to the combination of said styrene monomer and said butadiene monomer being between about 0.8:1 and about 2:1, the concentration of said alkyl naphthalene sulfonate in said aqueous phase being between about 50 parts per million and 1,000 parts per million by weight, and the weight of said nitric acid added to the mixture being between about 1 percent to about 20 percent of the aqueous phase weight.

20. A process for the preparation of polymers with a low ash content of from about 0.005 percent to about 0.03 percent, which comprises mixing monomers, first and second initiators in an aqueous phase comprised of water and a surfactant, heating the resulting mixture for about 1 minute to about 2 hours at a temperature of from about 50° C. to about 110° C. to accomplish partial polymerization, subject to the provision that no suspension stabilizing component is present during initiation of polymerization, thereafter mixing in a finely-divided water insoluble, monomer insoluble suspension stabilizer in an amount of between about 0.5 percent and about 20 percent of the weight of said monomers, thereafter continuing the polymerization from between about 1 hour to about 15 hours, thereafter heating the mixture at a temperature of from about 110° C. to about 150° C., cooling the mixture and adding an acid, thereafter isolating the resulting styrene butadiene copolymer with a weight average molecular weight of between about 10,000 and 500,000, a molecular weight distribution of between about 2 and about 9, a Tg of between about 45° C. and about 75° C., the ratio of said styrene monomer and said butadiene monomer being between about 80:20 and about 95:5 by weight, the weight proportion of said aqueous phase to the combination of said styrene monomer and said butadiene monomer being between about 0.8:1 and 2:1.

21. A process in accordance with claim 20 wherein there is selected a styrene monomer and a butadiene monomer.

22. A process in accordance with claim 20 wherein the suspension stabilizer is tricalcium phosphate.

23. A process for the preparation of polymers which comprises forming an aqueous phase comprised of water and a surfactant; adding to the aqueous phase at least two monomers; subsequently initiating polymerization of the monomers by heating, subject to the provision that no suspension stabilizing component is present during initiation of polymerization; thereafter adding a suspension stabilizing component; completing polymerization; cooling and washing the polymer product obtained, which product has an ash content of from about 0.005 percent to about 0.03 percent.

24. A process in accordance with claim 23 wherein the suspension stabilizing component is tricalcium phosphate.

25. A process in accordance with claim 23 wherein the surfactant component is sodium alkyl naphthalene sulfonate.

26. A process in accordance with claim 23 wherein the monomers are comprised of styrene and butadiene.

* * * * *